Figure 1:
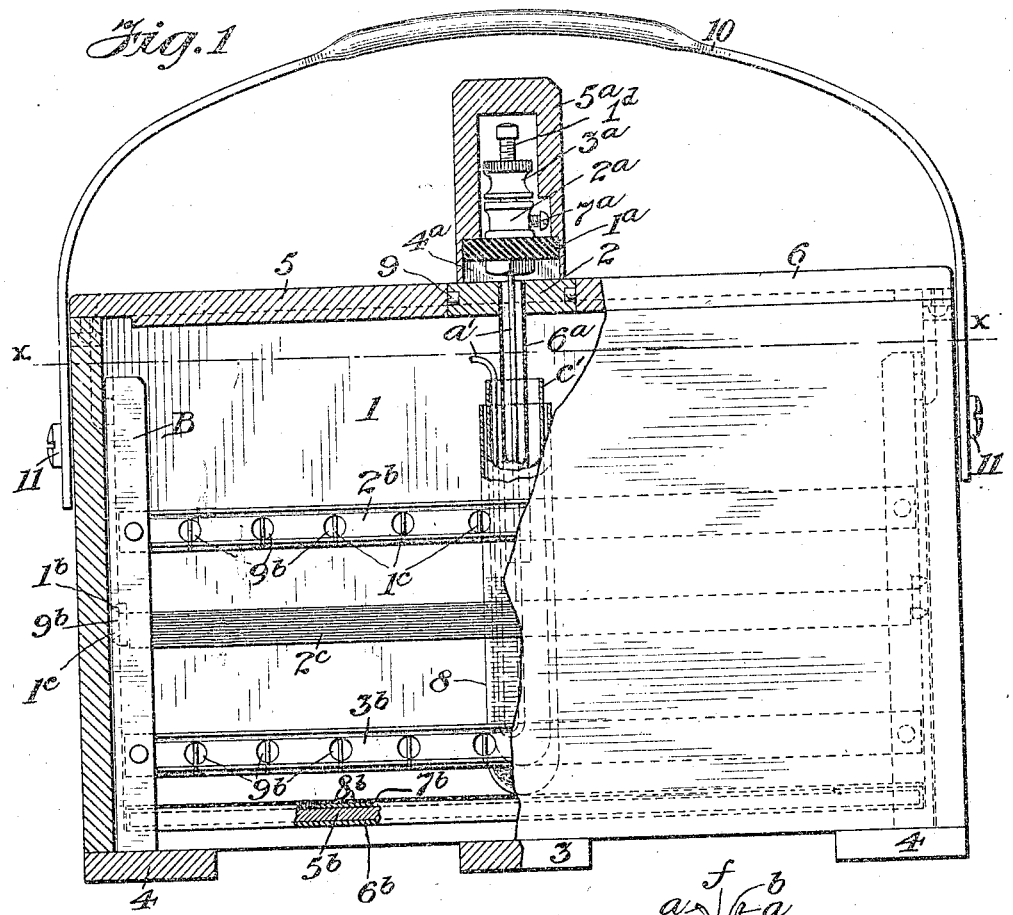

E. MARCUSON.
ELECTRICAL TESTING BATTERY.
APPLICATION FILED JULY 6, 1912.

1,069,888.

Patented Aug. 12, 1913.
2 SHEETS—SHEET 1.

Witnesses:
Chas. F. Clagett
Charlotte De Long.

Inventor:
Elias Marcuson
By Philip K. Stern
his Attorney

UNITED STATES PATENT OFFICE.

ELIAS MARCUSON, OF NEW YORK, N. Y.

ELECTRICAL TESTING-BATTERY.

1,069,888.

Specification of Letters Patent.

Patented Aug. 12, 1913.

Application filed July 8, 1912. Serial No. 708,032.

*To all whom it may concern:*

Be it known that I, ELIAS MARCUSON, a subject of the King of Great Britain, and at present residing in the city of New York, in the county and State of New York, have invented certain new and useful Improvements in Electrical Testing-Batteries, of which the following is a specification.

My invention relates to the electrical testing of batteries and pertains, in the main, to a type of portable high potential battery employed in testing out electrical installations, cables, conduits and the like, and the locating of faults therein, and supplying a temporary current for a system of electrical distribution of the required potential as a substitute for the working current thereof during the period in which it is desired to make tests for insulation and other conditions requisite for the proper operating condition of the system. In considering these types of batteries, ranging from 50 volts upward, my attention was directed to the difficulties of insulating the cells, not only with respect to each, within the container or box, but the preservation of effective insulation between the container and the ground or other common conducting medium.

The question of battery insulation where from 50 volts to 500 or 1000 must be considered, presents considerable difficulty in open types of cells where the electrolyte has an opportunity of creeping such for example as is customary in accumulator cells.

It is the object of my invention to improve first the insulation of batteries of this type between the several cells or elements thereof, and further to improve the insulation throughout as well as to provide facilities for expediting the examination of the battery, and render it readily renewable throughout or in part, and finally provide a simple and inexpensive construction embracing these objects whereby I am enabled to place the battery on the market at a comparatively low price. The different features characteristic of my invention wherein these objects lie are embraced in the construction as illustrated in the drawings hereto attached which when taken with the co-relative appended descriptive matter forms a part of this specification and the distinct features of novelty are referred to in the claims appended hereto.

Figure 2:
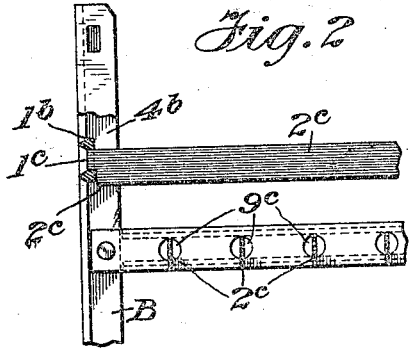
Figure 4:
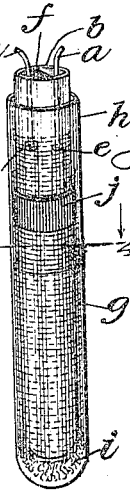
Figure 3:
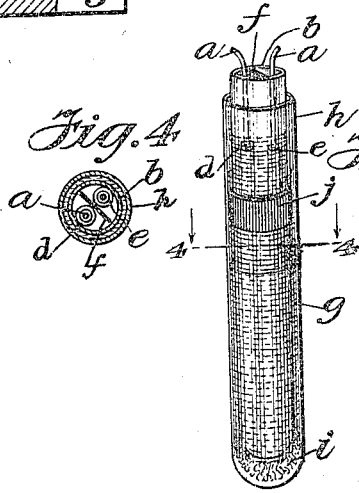
Figure 5:
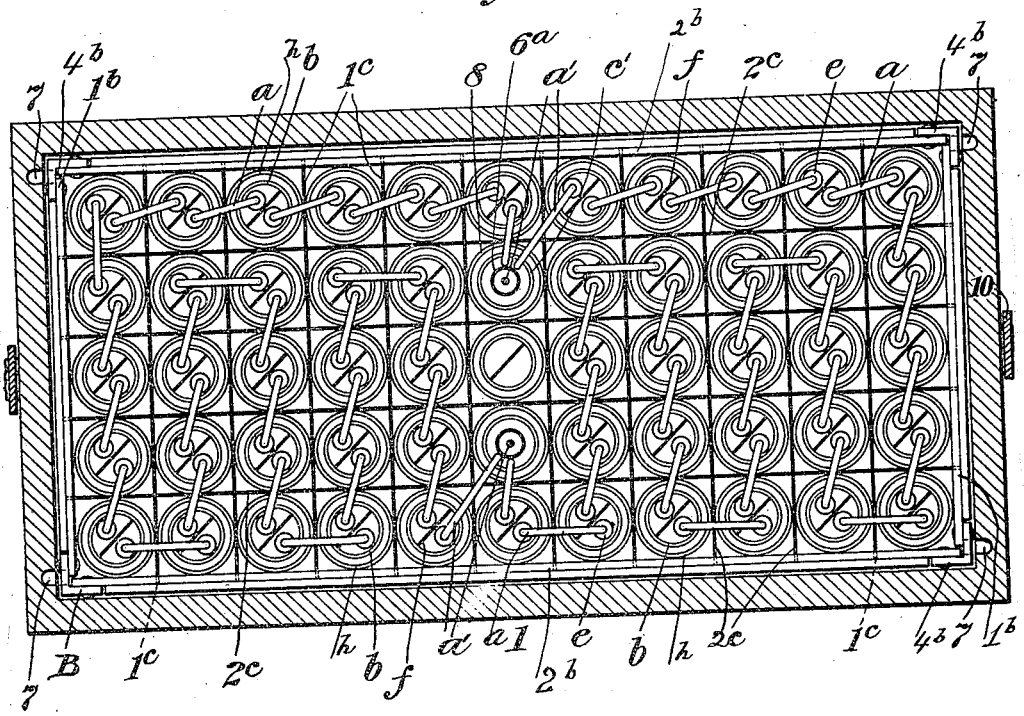

With reference to the drawings, Figure 1 is a side elevational view of my improved portable testing battery with a portion of the side nearest to the observer removed. Fig. 2 is a fragmentary detailed view of the cell carrying crate, and the insulating nesting for the cells. Fig. 3 is a side elevational view of one of my improved battery cells, together with its insulating jacket. Fig. 4 is a cross sectional view of the same taken on a line 4—4 of Fig. 3. Fig. 5 is a plan view of the battery box taken on the line $x$—$x$, Fig. 1, showing the crate, cells and connections.

In the several figures similar characters of reference are employed to indicate like or the same parts wherein—

1 designates the battery box which is preferably constructed of well seasoned impregnated wood. It has a central cross batten 2 on the cover side, and an oppositely situated batten 3 on the bottom, as well as two similarly disposed end battens 4 4. The cover of the box 1 consists of two sections 5 and 6 each having end dowels 9 engaging the cross batten 2 whereby the sections 5 and 6 (which together comprise the cover of the box 1) are normally positioned. A strap or handle 10 having its free ends secured to the box 1 by screws 11, withhold the cover sections 5 and 6 against accidental displacement when the box is being carried by the strap 10 by end pressure.

$1^a$ designates a cross strip of insulating material upon which is mounted binding posts $1^d$ carrying nuts $2^a$ and $3^a$. The cross insulating strip $1^a$ is secured to and carried by the cross batten 2 by blocks $4^a$. The binding posts $1^d$ and nuts $2^a$ and $3^a$ are electrically connected with the terminal wire $a'$ of the electrodes from a battery cell $b$.

$5^a$ refers to a terminal cover or box; this is constructed preferably of wood or other insulating material carried by the insulating strip $1^a$ and housing the binding posts $1^d$ carrying nuts $2^a$ and $3^a$.

$b$ refers to one of my improved battery units or accumulator cells of the testing battery which is built up of a battery cell or tube, and is preferably in the form of a glass test tube, within which is the electrolyte and a pair of battery elements $d$ and $e$ as well as a hard rubber or other suitable separator $f$ there-between.

The battery unit $b$ is insulated from a number of similar neighboring cells by plunging it in an oil bath $g$, contained in an outer carrying tube $h$. The former tube is cushioned therein by a quantity of wool $i$ which is deposited in the bottom of the latter, which obviates accidental breakage of the glass due to concussion. A bushing $j$ around the tube or cell $b$ and within the cell $h$ provides a spacing means to maintain an annular space between the tubes or cells $b$ and $h$ wherein a film or jacket of insulating oil $g$ is carried. When a series of these battery units $b$ are connected together, the terminals $a'$ of the electrodes are insulated in a similar manner by oil insulating jackets 8, and to further insure the insulation of said terminals from the box 1 or the cross batten 2 I provide an insulating rubber tubing $6^a$ which is secured to the batten 2, and depends downwardly therefrom within the box 1 and into a quantity of insulated oil contained in a test tube or cell $c'$. This terminal $a'$ is connected with a binding nut $2^a$ and after passing down through the insulating oil in the tube $c'$ it is bent upon itself and carried up through the insulating oil along side of the tube $c'$ where it is carried to an element $e$ of a battery unit $b$. To further insure the insulation of the terminal wire $a$ an oil jacket $g$ in the annular space within the tube $h$ is provided. The annular space is maintained between these two tubes by a bushing $j$. The cross batten 2 together with the binding nuts $2^a$ and $3^a$ arranged on the same binding posts $1^d$ and the insulating cross strip $1^a$, may be removed by loosening the binding screws $7^a$, and releasing the terminal wires $a'$ respectively.

The battery units $b$ are normally positioned and held within the battery box 1 by a crate B made preferably of non-corrosive metallic strips riveted together. These are in the instance illustrated of angular formation and comprise horizontal parallel cross members $1^b$ at the ends and similar longitudinal members $2^b$ and $3^b$, on opposite sides of the box 1 respectively and correspondingly similar vertical end members $4^b$ connecting the opposite ends thereof. The vertical members $4^b$ are secured to a bottom plate $5^b$ preferably of wood which is enveloped in a non-corrosive metallic casing $6^b$ and $7^b$ preferably of sheet lead. Upon the upper surface thereof rests a floor of insulating material $8^b$ preferably of hard rubber upon which the cells $h$ of the battery units $b$ and the terminal insulating cells $c$ rests.

The members $2^b$ and $3^b$ have a plurality of uniformly distributed openings $9^b$ spaced substantially equal to the diameter of the tube $h$ in which are transversely carried the ends $1^c$ of cross strips $2^c$ of insulating material preferably of hard sheet rubber, and the members $1^b$ are provided with similar openings for the retaining of the terminals $1^c$ of similar strips $2^c$ of insulating material longitudinally of the box 1. The longitudinal and cross strips $2^c$ of insulating material carried by the crate $1^b$, being arranged at right angles to each other in a manner as to provide a multiplicity of nests as clearly shown in Fig. 5, within which the battery cells $b$, together with their insulating jackets $h$ are firmly held while they are carried by the insulated floor $8^b$.

It will be observed by the construction of my improved testing battery that the grouped units for the required electromotive force and current output, are each insulated from one another by an insulating oil jacket, which is supported on all sides by insulating material and due to the outer cylindrical wall and convex bottom of their outer cells, a minimum of contact with the insulating strips $2^c$ and the insulating floor $8^b$ is permitted which conduces to advantages in insulation, and moreover, the terminal wires $a$ of these units are insulated in an oil bath and the leading out ends thereof are protected by a tube of insulating material which envelops them to a point where they enter the binding nuts $2^a$.

In practice, the quantity of insulating oil $g$ contained within the jacket or tube $h$, is such as to extend approximately upward, for about one-half of the length of the cell $b$ or about two-thirds of the length of the cell or tube $h$. I have considered in this connection the portability of the battery as well as the oil insulation of the units $b$, and have therefore provided only partially filled insulating oil jackets for them in order that the battery box 1 together with the contained units $b$ may be tipped at a considerable angle from the normal horizontal position in any direction without spilling out the insulating oil $g$.

The length of the battery elements $d$ and $e$ are considerably less than that of their containing tube $b$, and the electrolyte in which they are immersed in the said tube is for the same reason kept correspondingly low but sufficient however, to properly cover the tops of the elements $d$ and $e$ in each of the containing cells.

Since the box 1 is merely a retainer for the crate B of the battery units $b$, any splashing or overflow from the cells or oil tubes $h$ will find a means of exit and escape from the edges of the bottom $5^b$ of the crate B and out of the crevices of the bottom of the box 1 which for the purpose of drainage is not made liquid-tight.

When it is desired to remove the crate B together with the battery units $b$ and electrode insulating cells $c$, the terminal cover $5^a$ is removed and the binding screws $7^a$ of the binding nuts $2^a$ are backed off so as to release the ends of the terminal wires $a'$ whereupon the cross batten 2 together with the insulating strip $1^a$, block $4^a$ and the binding nuts $2^a$ and $3^a$ may be removed. To effect the removal of the crate B and the aforesaid contents the cover sections 5 and 6 are taken off and the crate is lifted out together with its contents from the box 1, when an inspection of each unit *b* and the insulating cells may be made with facility, and the entire battery rendered accessible for cleaning, renovation or repair.

The battery elements *d* and *e* are composed of lead wire, and the terminals *a* are lead wires integral with and forming part of the elements *d* and *e*, and the electrolyte consists of the usual 25 per cent. sulfuric acid solution with water.

It will be understood by the preceding description of my improved electrical testing battery, that I have provided a simple and inexpensive construction, whereby the greatest degree of insulation between the units thereof may be preserved, while at the same time accessibility to them for inspection, renovation and repair is greatly facilitated, and Having fully described my invention, I claim as new and desire to secure by Letters Patent of the United States—

1. In a testing battery, a container, a plurality of unit battery cells provided with insulated envelops and an insulating oil contained therein surrounding the battery cells the latter being electrically connected up within the container, terminals for the said cells leading out of the container and oil insulating jackets surrounding the said terminals.

2. In a testing battery of the character described, the combination of a plurality of electrically connected battery units, and a container therefor, a removable non-corrosive metallic carrying crate provided with cross strips of insulating material and disposed within the said crate as a lattice work nesting, said battery units being positioned and retained within the nesting, and oil insulating jackets surrounding the bottom and side walls of each of the said battery units.

3. In a testing battery the combination of a plurality of cells each being provided with a surrounding tube containing an insulating oil, said tube having a bottom inner cushion, a spacing collar between the accumulator cells and the said tube adapted to concentrically position the former in the latter, a crate provided with longitudinal and transverse strips of insulating material disposed, with relation to each other, in the formation of nests, said cells together with the said insulating tubes being carried in the said nests, a containing box for the whole, terminal connectors carried by the box connecting the terminal electrodes of the said accumulator cells, insulating jackets for the electrodes a sectional removable cover for the box and a carrying strap secured thereto and embracing the cover; substantially as described.

4. In a testing battery the combination of a plurality of electrically grouped insulated cells, a non-corrosive metallic crate provided with insulating nests, the said cells being contained within the said nests, a container for the crate and cells, terminal connections carried by the container and connected with the leading-out terminals of a group of the said cells, and insulating jackets surrounding the leading-out terminals; substantially as described.

In testimony whereof, I have signed my name to this specification in the presence of two subscribing witnesses.

ELIAS MARCUSON.

Witnesses:
 ELIZABETH L. STERN,
 CHARLOTTE L. DE LONG.